June 20, 1950 L. G. REED 2,511,943
STORAGE BATTERY
Filed July 23, 1946

LELAND G. REED,
INVENTOR.

BY
Hazard & Miller
ATTORNEYS

Patented June 20, 1950

2,511,943

UNITED STATES PATENT OFFICE 2,511,943

STORAGE BATTERY

Leland G. Reed, Los Angeles, Calif., assignor to Reed Battery Corporation, North Hollywood, Calif., a corporation of California Application July 23, 1946, Serial No. 685,603

8 Claims. (Cl. 136—134)

This invention relates to improvements in storage batteries.

An object of the invention is to provide an improved storage battery wherein the plates of the battery are structurally connected together at their bottoms so as to reduce buckling of the plates and danger due to vibration.

Another object of the invention is to provide a storage battery wherein all positive plates are connected together at their bottoms electrically and in a similar manner, all negative plates will be connected together at their bottoms electrically. With such an electrical connection it is possible to charge and discharge the plates if they become broken either through the center or become detached from the terminal.

Another object of the invention is to provide a storage battery wherein the plates have downwardly extending extensions or legs which are integral with their respective plates and which are sufficiently long that when welded together they will rest firmly on the flat bottom of the battery container. Such an arrangement supports the weight of the assembled plates directly on the bottom of the container and induces the normally cold and dormant acid which lies near the bottom of the container to rise and circulate up through the cell whenever the plates become hot.

Still another object of the invention is to provide a battery wherein the container has upstanding ribs or webs on the bottom thereof and wherein the structural and electrical connections between the bottoms of the positive and negative plates, respectively, are disposed on opposite sides of the upstanding ribs or webs with the bottom edges of the plates supported by the legs or extensions above the ribs. This arrangement eliminates the wearing of the plates into or by the rib. Oxide tending to settle has little, if any, opportunity to rest on top of the rib and short circuit between the connections at the bottoms of the positive and negative plates. An adequate space is also provided for the free circulation of electrolyte.

With the foregoing and other objects in view which will be made manifest in the following detailed description and specifically pointed out in the appended claims, reference is had to the accompanying drawings for an illustrative embodiment of the invention, wherein:

Figure 2:
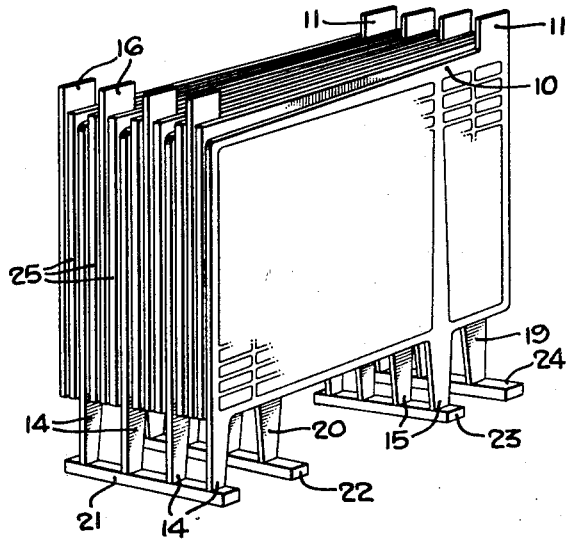
Fig. 2 is a perspective view of a group of assembled plates of the battery embodying the present invention.
Figure 1:
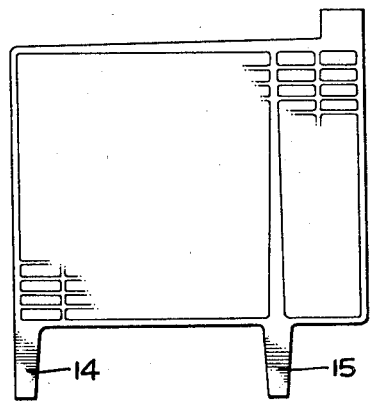
Figure 1 is a view in side elevation of one of the battery plates employed in the battery embodying the present invention.
Figure 3:
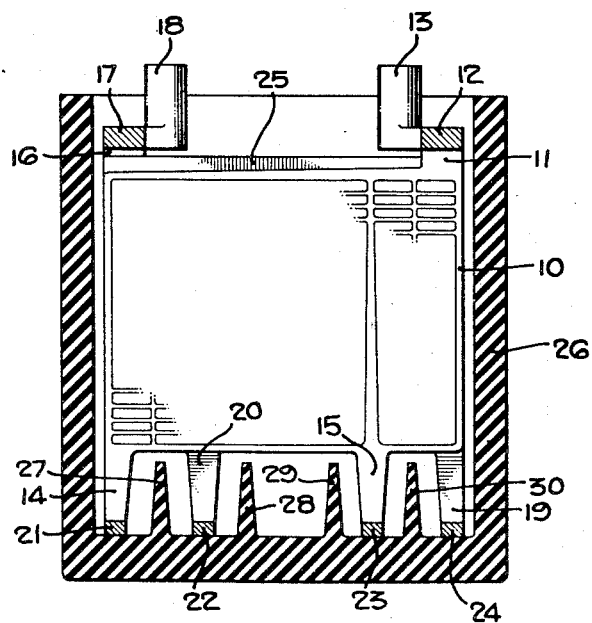
Fig. 3 is a transverse section through the battery embodying the present invention.

Referring to the accompanying drawings wherein similar reference characters designate similar parts throughout, alternate plates constituting positive plates indicated at 10 are illustrated as having upper extensions 11 at their upper right-hand corners which are attachable to a bus bar 12 that is connected to the positive terminal 13. These plates have downwardly extending extensions or legs 14 at their lower left-hand corners and similar legs 15 that are spaced inwardly from the lower right-hand corners of these plates. In a similar manner, the intermediate plates constituting negative plates have upwardly extending extensions 16 near their left-hand corners attachable to a bus bar 17 leading to a negative terminal 18 and these plates have downwardly extending extensions 19 at their lower right-hand corners and similar legs 20 that are spaced inwardly from their lower left-hand corners.

When the plates are assembled together, bars or feet 21, 22, 23, and 24 are burned or welded onto the legs 14, 20, and 15 and 19, respectively. These bars or feet serve to structurally connect the plates at their bottoms and electrically connect the positive plates and the negative plates, respectively near their bottoms. The separators between the plates are indicated at 25.

When the plates have been thus assembled they are placed in a container 26 containing any usual or conventional electrolyte and this container has on its bottom a plurality of upstanding ribs or webs 27, 28, 29, and 30. The top edges of the ribs or webs are spaced slightly from the bottom edges from the bodies of the plates. The bars or feet 21, 22, 23, and 24 rest on the bottom of the container 26 with the bars 21 and 22 disposed on opposite sides of the web 27. In a similar manner, the bars or feet 23 and 24 are disposed on opposite sides of the web 30. The webs 28 and 29 are between the bars or feet 22 and 23. With this arrangement the weight of the plates is supported directly on the bottom of the container 26 and by reason of the structural connections between the bottoms of the plates they are firmly held in position even under vibration. The bars or feet also provide electrical connections between positive and negative plates, respectively. Any oxide tending to settle in the container has little, if any, opportunity to rest on top of the narrow ribs or webs 27, 28, 29, and 30. Consequently, there is little, if any, opportunity of short circuiting taking place between bars 21 and 22, 23 and 24, or 22 and 23.

I claim as my invention:

1. A storage battery comprising a case having upstanding webs on the bottom thereof, positive and negative plates within the case, and legs on the plates supporting the plates on the bottom of the case, the legs of the positive plates being arranged on the opposite side of a web from that on which the legs of the negative plates are arranged.

2. A storage battery comprising a case having upstanding webs on the bottom thereof, positive and negative plates within the case, and legs on the plates supporting the plates on the bottom of the case, the legs of the positive plates being arranged on the opposite side of a web from that on which the legs of the negative plates are arranged, the body of the plates being supported by the legs in spaced relation to the tops of the webs.

3. A storage battery comprising a case having upstanding webs on the bottom thereof, positive and negative plates within the case, legs on the plates supporting the plates on the bottom of the case, the legs of the positive plates being arranged on the opposite side of a web from that on which the legs of the negative plates are arranged, conducting means connecting the legs of the positive plates together, and conducting means connecting the legs of the negative plates together.

4. A storage battery comprising a case, positive and negative plates in the case, legs on the plates supporting the plates on the bottom of the case, and means on the bottom of the case disposed between the positive plate legs and the negative plate legs for preventing oxides settling to the bottom of the case from shorting between the positive and negative legs.

5. A storage battery comprising a case, positive and negative plates in the case, legs on the plates supporting the plates on the bottom of the case, and upstanding webs on the bottom of the case arranged between the positive legs and the negative legs.

6. A storage battery comprising a case, positive and negative plates in the case, legs on the plates supporting the plates on the bottom of the case, conducting means integrally connecting the bottoms of the positive legs, conducting means integrally connecting the bottoms of the negative legs, and means on the bottom of the case interposed between the connected positive legs and the connected negative legs for preventing settling oxides from shorting between the legs.

7. A storage battery comprising a case, positive and negative plates in the case, legs on the plates supporting the plates on the bottom of the case, conducting means integrally connecting the bottoms of the positive legs, conducting means integrally connecting the bottoms of the negative legs, and upstanding webs integral with the bottom of the case interposed between the connected positive legs and the connected negative legs for preventing settling oxides from shorting between the legs.

8. In a storage battery a group of positive plates and a group of negative plates, each group having means adjacent aligned upper corners thereof for connecting the plates to a battery terminal, the lower, diagonally opposite corners of the plates of each group having downwardly extending legs thereon integrally connected together, the plates of each group having other legs on the bottom edges thereof integrally connected together and spaced inwardly from the other lower corners of the plates.

LELAND G. REED.

REFERENCES CITED

The following references are of record in the file of this patent:

UNITED STATES PATENTS

| Number | Name | Date |
| --- | --- | --- |
| 385,558 | King | July 3, 1888 |
| 1,322,102 | Gardiner | Nov. 18, 1919 |
| 1,327,234 | Handler | Jan. 6, 1920 |